Patented Sept. 22, 1953

2,652,624

UNITED STATES PATENT OFFICE 2,652,624

METHOD OF PRODUCING COMPOSITE METAL

Edward Joseph Guinee, Roselle, N. J., assignor to The H. A. Wilson Company, Newark, N. J., a corporation of New Jersey No Drawing. Application August 28, 1948, Serial No. 46,715

1 Claim. (Cl. 29—189)

This invention relates to the manufacture of composite metals having a surface layer composed primarily of mixed silver and graphite. The invention provides both a new and improved composite metal product of this character, and a method for making it.

Composite metals having a surface layer of mixed silver and graphite are particularly advantageous for making electrical contact elements, especially contact elements for use in interrupting electrical circuits in which fairly large currents flow. This is due to the fact that mixtures of silver and graphite are good conductors of electricity, can be made into contacts having low contact-surface resistance, and, most particularly, are not prone to stick or weld to a mating contact in consequence of such arcing as occurs when a circuit carrying a fairly heavy direct current is interrupted. However, this last characteristic of being difficultly weldable, which makes a mixture of silver and graphite a desirable facing material for a contact element, also makes the production of such contact elements very difficult to achieve—i. e., it is extremely difficult to produce a satisfactory bond between a facing layer composed of a mixture of silver and graphite, and a backing layer. About the only way heretofore developed for making a satisfactory bond between a layer of mixed silver and graphite and an underlying metallic layer has been to prepare a compacted mass of silver and graphite powders by powder-metallurgy techniques, and then to burn the graphite in an oxidizing atmosphere from surface layers of the compact. The thus-treated compact then can be welded, soldered or brazed to a metal backing element because its surface is graphite free. This method, however, is subject to a number of disadvantages. It requires a considerable number of manipulative steps to prepare the compact and to weld it to the backing; and it is always necessary to finish the product by grinding or machining a considerable amount of metal from the surface of the completed article in order to expose a surface from which the graphite has not been burned away.

While mixtures of silver and graphite containing say 2 to 6% by weight of graphite are extremely difficult to weld to almost all ferrous and non-ferrous metals and alloys, I have found that a very satisfactory weld can be made between a layer composed of such a mixture and a layer of substantially pure silver. Such welding may be accomplished by compressing the layer of mixed silver and graphite against the silver layer while heating both layers to a silver-welding temperature near but below the melting point of silver. The bond thus produced between the two layers is mechanically strong and of negligible electrical resistivity; and composite products made in this fashion are therefore well suited for use in making electric contact elements.

An advantageous embodiment of the invention as it is applied to the manufacture of a composite metal comprising a steel backing having thereon a surface layer of mixed silver and graphite is described below:

A steel sheet or billet of desired thickness is suitably cleaned and is clad on at least one side with a layer of substantially pure silver. The silver-cladding of the steel may be accomplished in the manner described in my U. S. Patent No. 2,392,917, which, briefly, involves fusing a thin film of copper (applied as metal powder) on a surface of the steel, heating the resulting copper-coated steel until a substantial part of the copper has diffused into the steel, and welding a layer of substantially pure silver to said copper film by pressing the layer of silver against the copper-coated steel while maintaining it at a temperature above the melting point of the copper-silver eutectic but below the melting point of silver. As pointed out in my above-mentioned patent, the "copper" intervening between the silver and the steel may be substantially pure copper, or it may be a high-copper alloy containing 60% or more of copper, such as an alloy composed of about 80% copper, 5 to 10% nickel, and 15 to 10% silver.

Alternatively, the steel may be clad with a layer of substantially pure silver in some other fashion, as by electroplating. I prefer, however, to use the method of my above-mentioned patent, because it results in a superior bond between the silver layer and the steel.

In speaking of a layer of "substantially pure" silver, I mean to include not only pure silver, but also the usual sterling silver alloys which contain usually about 5 to 7.5% copper. The alloy may, in addition, contain small proportions, not exceeding about 2.5%, of nickel. In any event, the silver content of any such alloy which may be used as the "substantially pure" silver layer in accordance with this invention is composed of at least 90% by weight of silver. It is my presently preferred practice to employ really pure unalloyed silver (999 fine), but very satisfactory results have been obtained using the ordinary sterling silver alloys, and sterling silver alloys to which up to 2.5% nickel have been added. The silver layer should be substantially oxygen-free, because the presence of oxygen therein leads to blistering during welding of the silver to the steel or of the silver-graphite layer to the silver, if welding is performed in an atmosphere containing free hydrogen.

Next a layer of mixed silver and graphite is applied to the silver layer of the silver-clad steel. The mixed silver and graphite layer is compressed against the substantially pure silver layer with a force of about 200 pounds per square inch, more or less, while heating said layers to a temperature near but below the melting point of silver. Thereby the silver-graphite layer becomes securely bonded to the substantially pure silver layer.

As in all welding operations, the mating surfaces of the substantially pure silver layer and the silver-graphite layer should be well cleaned. The welding operation, however, does not require the presence of any flux, and I prefer to carry it out without any flux being used. Pure silver melts at 1761° F., and the temperature at which the silver-graphite layer is welded to the substantially pure silver layer is below this value. A welding temperature in the range from 1400° F. to 1650° F. is generally satisfactory. The time required for welding is shortest with temperatures in the upper portion of this range (above about 1600° F.), but the welding operation can be carried out more safely, and with less need for critically watching its progress, at temperatures in the lower part of the range.

Welding preferably is carried out in a substantially neutral atmosphere. If the welding atmosphere is substantially oxidizing, graphite will be burned from the silver-graphite layer; and if it is substantially reducing on account of the presence of uncombined hydrogen, and if the silver contains oxygen, objectionable blowholes and blisters may form in the silver layer. Since as a practical matter it is very difficult to produce a truly non-oxidizing welding atmosphere that is also hydrogen-free, the silver should be oxygen-free. Then a modest amount of hydrogen may be present in the welding atmosphere without causing blistering.

The silver-graphite layer should, of course, be pressed tightly against the pure silver layer, so that no voids occur at the interface between the two layers. The layers may be held pressed together during welding by placing them between steel platens which are clamped or otherwise pressed together mechanically, as is customary in the production of clad metal billets.

As stated above, the graphite content of the layer of mixed silver and graphite is preferably in the range from 2 to 6% by weight. The silver-graphite layer may be applied to the substantially pure silver layer either in the form of a sheet of mixed silver and graphite (previously prepared, for example, by compacting and sintering a mixture of silver and graphite powders), or in the form of mixed silver and graphite powders, mixed in the desired proportions, spread evenly directly on the substantially pure silver layer. In either case, the welding procedure by which the silver-graphite layer is bonded to the underlying silver layer is substantially the same. When it is a mixture of silver and graphite powders that is applied to the silver layer, the welding operation not only serves to bond this layer to the silver, but also to transform the silver and graphite powders into an integral silver-graphite mass.

After the silver-graphite layer has been bonded to the silver layer, the resulting composite metal may be reduced by rolling to a lesser thickness, if desired. I have found, however, that after the silver-graphite layer has been applied the maximum amount of reduction that can be effected by cold rolling is about 30%. Accordingly the silver-graphite layer should be applied in such thickness, and the pure silver layer and the steel should be reduced to such thickness prior to application of the silver-graphite layer, so that the maximum amount of rolling thereafter necessary to reduce the composite metal to final thickness will not exceed from 20% to 30% reduction in area.

Although the foregoing example deals particularly with the preparation of a silver-graphite composite product having a steel backing, it is not an essential part of the invention that the backing be of steel. In lieu of steel, a copper, brass, nickel, or other metallic backing, to which the substantially pure silver layer is welded, may be employed. Alternatively, the substantially pure silver layer may itself be the backing, in which event the composite metal will consist only of a substantially pure silver layer welded to the silver-graphite layer.

Electric contact elements, or other desired articles, may be stamped or otherwise formed from the rolled composite metal product. For example, if the finished product is sufficiently thin (say from 0.015 to 0.040 inch in thickness), small disks may be blanked therefrom and the backing layer may be welded or soldered to a rivet head or other component of a contact assembly. The blanks may be formed with welding projections or serrations on the back, if desired, to facilitate welding to contact arms, brackets, etc. If the product is rolled to a thicker gauge, contact elements may be made by cold plastic deformation operations (e. g. upsetting) or by machining.

It is characteristic of composite metal products produced in accordance with the invention that the silver-graphite surface layer is bonded directly to a dense, non-porous, substantially pure silver layer. In this respect, it is superior, both mechanically and electrically, to composite metals made by the heretofore known method of burning graphite from the surface layers of a silver-graphite compact and then soldering or welding the compact to a backing. Composite metals made in this heretofore known fashion have the disadvantage that the silver-graphite layer is inclined to be somewhat porous in the region where it is bonded to the backing metal. This porosity, of course, results from having burned out the graphite originally present.

I claim:

The method of producing a composite metal having a surface layer of mixed silver and graphite and a backing of steel which comprises applying a layer of dense non-porous substantially pure silver to a steel sheet, applying an even layer of a mixture of silver and graphite powders directly to said dense non-porous silver layer, compressing said layer of mixed powders against the silver layer while heating both layers to a silver-welding temperature near but below the melting temperature of silver, whereby the layer of mixed silver and graphite powders is transformed into an integral silver-graphite layer which is firmly bonded to the underlying substantially pure silver layer, and reducing the resulting composite metal to final thickness by cold rolling, the thickness of the silver-graphite layer as applied to the silver layer and the thickness of the steel and pure silver layers prior to application of the silver-graphite layer being such that final thickness of the composite metal is attained after rolling to a maximum extent of 30% reduction in area.

EDWARD JOSEPH GUINEE.

References Cited in the file of this patent

UNITED STATES PATENTS

| Number | Name | Date |
|---|---|---|
| 1,802,718 | Jennings | Apr. 28, 1931 |
| 1,986,224 | Sanders | Jan. 1, 1935 |
| 2,319,240 | Larsen | May 18, 1943 |
| 2,365,249 | Comstock | Dec. 19, 1944 |
| 2,389,061 | Kuzmick | Nov. 13, 1945 |
| 2,392,917 | Guinee | Jan. 15, 1946 |
| 2,418,811 | Adams | Apr. 15, 1947 |
| 2,425,053 | Swinehart | Aug. 5, 1947 |
| 2,486,341 | Stumbock | Oct. 25, 1949 |
| 2,492,142 | Germeshausen | Dec. 27, 1949 |

FOREIGN PATENTS

| Number | Country | Date |
|---|---|---|
| 578,936 | Great Britian | July 17, 1946 |